US008387017B2

(12) United States Patent
Calendino et al.

(10) Patent No.: US 8,387,017 B2
(45) Date of Patent: Feb. 26, 2013

(54) BLACK BOX TESTING OPTIMIZATION USING INFORMATION FROM WHITE BOX TESTING

(75) Inventors: Rob Calendino, Kanata (CA); Craig Robert Earl Conboy, Kanata (CA); Guy Podjarny, Haifa (IL); Ory Segal, Haifa (IL); Adi Sharabani, Haifa (IL); Omer Tripp, Haifa (IL); Omri Weisman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/553,417

(22) Filed: Sep. 3, 2009

(65) Prior Publication Data

US 2011/0055813 A1    Mar. 3, 2011

(51) Int. Cl.
*G06F 9/44*   (2006.01)
*G06F 9/45*   (2006.01)
*G06F 9/00*   (2006.01)

(52) U.S. Cl. ........ 717/124; 717/127; 717/130; 717/131; 717/154; 717/158; 712/227; 726/22; 726/23; 726/25

(58) Field of Classification Search .............. None
See application file for complete search history.

(56) References Cited

U.S. PATENT DOCUMENTS

| | | | |
|---|---|---|---|
| 7,398,517 B2* | 7/2008 | Berg et al. ............... | 717/126 |
| 2002/0199122 A1* | 12/2002 | Davis et al. ............... | 713/201 |
| 2005/0166094 A1* | 7/2005 | Blackwell et al. ......... | 714/38 |
| 2007/0083933 A1* | 4/2007 | Venkatapathy et al. .... | 726/25 |
| 2007/0271617 A1* | 11/2007 | Mitomo et al. ............ | 726/25 |
| 2007/0283441 A1* | 12/2007 | Cole et al. ................. | 726/25 |
| 2008/0263525 A1* | 10/2008 | Berg et al. ................. | 717/131 |
| 2008/0263671 A1* | 10/2008 | Solino Testa et al. ..... | 726/25 |
| 2008/0301647 A1* | 12/2008 | Neystadt et al. .......... | 717/127 |
| 2009/0119777 A1* | 5/2009 | Jeon ........................... | 726/25 |

\* cited by examiner

*Primary Examiner* — Henry Tsai
*Assistant Examiner* — Michael Sun
(74) *Attorney, Agent, or Firm* — VanLeeuwen & VanLeeuwen; Terrence J. Carroll (57) ABSTRACT

Testing a computer software application by identifying a sink in the computer software application, identifying a source associated with the sink in the application, identifying an entry point associated with the source in the application, where the source is configured to receive input provided externally to the application via the entry point, determining a sink type represented by the sink, and providing to a testing application information identifying the entry point and in association with the sink type.

10 Claims, 5 Drawing Sheets

BLACK BOX TESTING OPTIMIZATION USING INFORMATION FROM WHITE BOX TESTING

FIELD OF THE INVENTION

The invention relates to computer software analysis and testing in general, and more particularly to optimizing black box testing using information obtained from white box testing.

BACKGROUND OF THE INVENTION

Software testing methods fall into two general categories: white box testing and black box testing. White box testing methods entail exposing and statically analyzing the internal workings of a software application, without executing the application. Black box testing methods, on the other hand, entail testing an application during its execution and without relying on any knowledge of the internal structure of the application. Although white box testing provides the advantage of revealing the precise nature and location of a potential vulnerability of an application, as the application has not been executed, any such exposed vulnerability is theoretical, providing no proof of vulnerability to the developer. Additionally, the exposed vulnerability is seen from a perspective internal to the application, whereas it may be advantageous to view the vulnerability from a user's perspective.

Conversely, having executed the application, black box testing both provides the developer with proof of vulnerability, and exposes susceptibilities to attacks from a user's point of view. However, black box testing is often computationally expensive as the tester is 'blind' to the internal structure of the application, requiring many execution attempts before a vulnerability is discovered. Typically, each input parameter may have numerous possible test values. As the number of input parameters increases, the number of possible permutations of input scenarios become huge. Systems and methods for reducing the number of input scenarios for black box testing would thus be advantageous.

SUMMARY OF THE INVENTION

The invention in embodiments thereof discloses novel systems and methods for black box testing optimization using information from white box testing.

In one aspect of the invention a method is provided for testing a computer software application, the method including a) identifying a sink in a computer software application, b) identifying a source associated with the sink in the application, c) identifying an entry point associated with the source in the application, where the source is configured to receive input provided externally to the application via the entry point, d) determining a sink type represented by the sink, and e) providing to a testing application information identifying the entry point and in association with the sink type, where any of the identifying, determining, and providing steps are implemented in either of computer hardware and computer software and embodied in a computer-readable medium.

In another aspect of the invention the method further includes applying to the application via the entry point an input only if the input is of a type that matches the sink type.

In another aspect of the invention a method is provided for testing a computer software application, the method including a) identifying a sink in a computer software application, b) identifying a source associated with the sink in the application, c) identifying an entry point associated with the source in the application, where the source is configured to receive input provided externally to the application via the entry point, d) determining a sink type represented by the sink, and e) creating a test template for the sink in accordance with the sink type, where any of the identifying, determining, and creating steps are implemented in either of computer hardware and computer software and embodied in a computer-readable medium.

In another aspect of the invention the method further includes providing to a testing application the test template in association with information identifying the entry point.

In another aspect of the invention the method further includes configuring the testing application to create a test using the test template.

In another aspect of the invention the method further includes configuring the testing application to apply the test to an executable format of the application via the entry point.

In another aspect of the invention a system is provided for testing a computer software application, the system including a white box tester configured to identify a sink in a computer software application, identify a source associated with the sink in the application, identify an entry point associated with the source in the application, where the source is configured to receive input provided externally to the application via the entry point, and determine a sink type represented by the sink, and a black box tester configured to receive information provided by the white box tester indicating that the entry point is associated with the sink type, where any of the white box tester and the black box tester are implemented in either of computer hardware and computer software and embodied in a computer-readable medium.

In another aspect of the invention the black box tester is configured to apply an input via the entry point to an executable format of the application only if the input is of a type that matches the sink type.

In another aspect of the invention for testing a computer software application, the system including a white box tester configured to identify a sink in a computer software application, identify a source associated with the sink in the application, identify an entry point associated with the source in the application, where the source is configured to receive input provided externally to the application via the entry point, and determine a sink type represented by the sink, and a parser configured to create a test template for the sink in accordance with the sink type, where any of the white box tester and the parser are implemented in either of computer hardware and computer software and embodied in a computer-readable medium.

In another aspect of the invention the system further includes a black box tester configured to receive the test template in association with information identifying the entry point.

In another aspect of the invention the black box tester is configured to create a test using the test template.

In another aspect of the invention the black box tester is configured to apply the test to an executable format of the application via the entry point.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
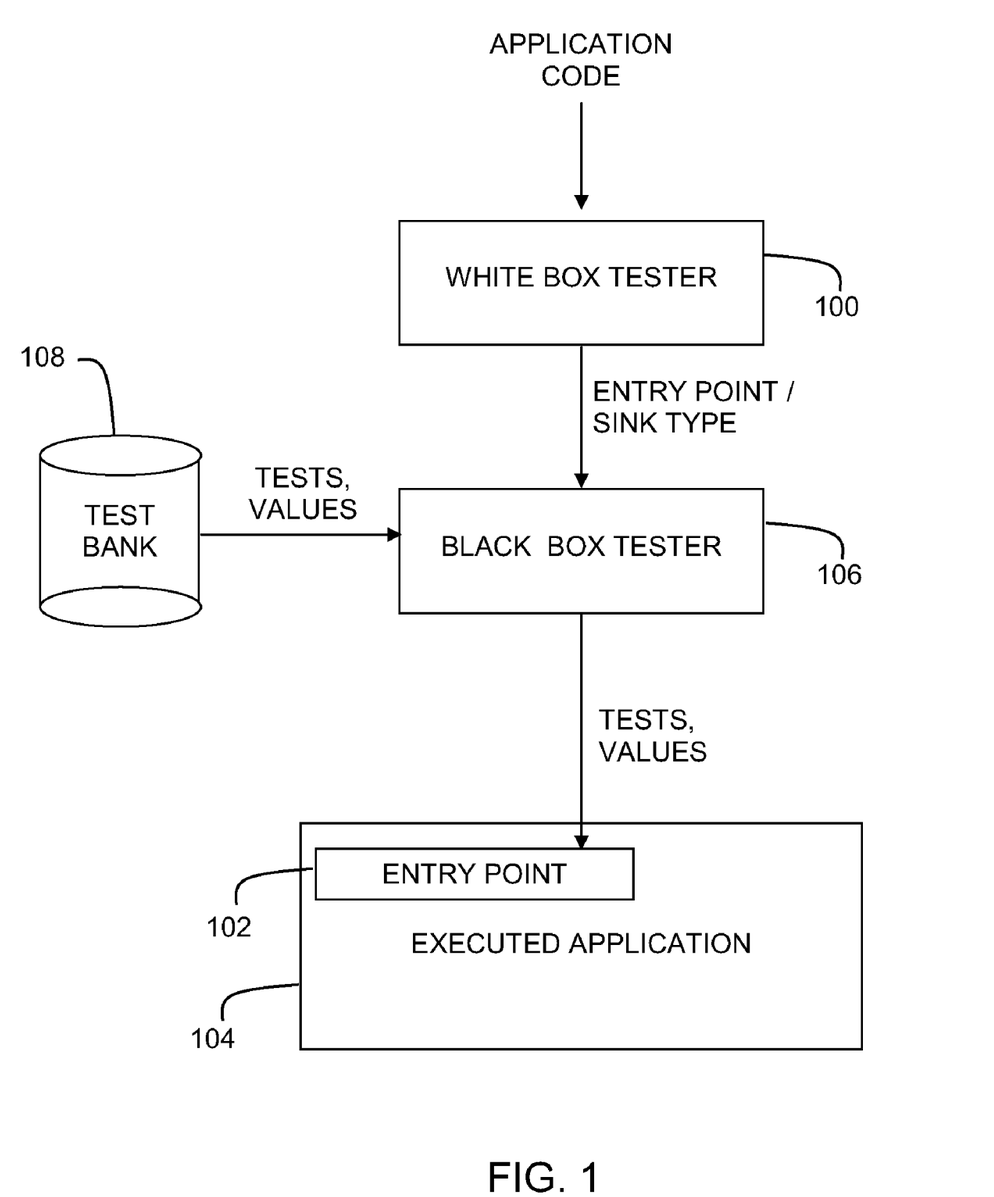
FIG. 1 is a simplified conceptual illustration of a system for optimizing black box testing using white box testing information, constructed and operative in accordance with an embodiment of the invention.

Reference is now made to FIG. 1 which is a simplified conceptual illustration of a system for optimizing black box testing using white box testing information, constructed and operative in accordance with an embodiment of the invention. In the system of FIG. 1, a white box tester 100 obtains the instructions of a computer software application, where the instructions are in the form of source code or bytecode. White box tester 100 uses conventional methods, such as static analysis, to analyze the instructions of the application to identify information flows within the application. In particular, tester 100 identifies one or more sinks within the application, one or more sources within the application associated with any identified sink, as well as one or more entry points 102, such as an HTTP (Hypertext Transfer Protocol) form parameter, associated with any identified sources, where each source is configured to receive input provided externally to the application via entry point 102 when the application is run as an executed application 104. Tester 100 determines a sink type represented by each sink in accordance with a predefined set of sink types, and thus establishes an association between each entry point 102 and the sink type of the sink with which each entry point 102 is associated.

Information identifying application entry points and their associated sink types as identified by white box tester 100 is provided to, or otherwise made available to, a black box tester 106, such as via one or more notifications from white box tester 100 or via a entry point/sink type database (not shown) that is accessible to both white box tester 100 and black box tester 106. Black box tester 106 determines what tests to perform on executed application 104, preferably in accordance with predefined testing criteria. In one embodiment, black box tester 106 selects the entry points 102 that are to be tested, and then selects only those tests that are applicable to the identified sink types of the selected entry points 102. Alternatively, black box tester 106 selects from among the sink types identified within the application by white box tester 100, identifies the entry points 102 of executed application 104 that are associated with the selected sink types, and selects only those tests that are applicable to the selected sink types and entry points. For each entry point 102 of executed application 104 that is to be tested by black box tester 106, black box tester 106 preferably selects the appropriate tests and any applicable test values to be applied to entry point 102, such as from a test bank 108 of predefined tests and test values or value ranges, and applies the selected tests to entry point 102. For example, if the sink type associated with a given HTTP parameter entry point of executed application 104 is an SQL query, black box tester 106 will only test the entry point using test cases that are relevant for situations where SQL queries are used, such as by performing SQL Injection tests.

Figure 2:
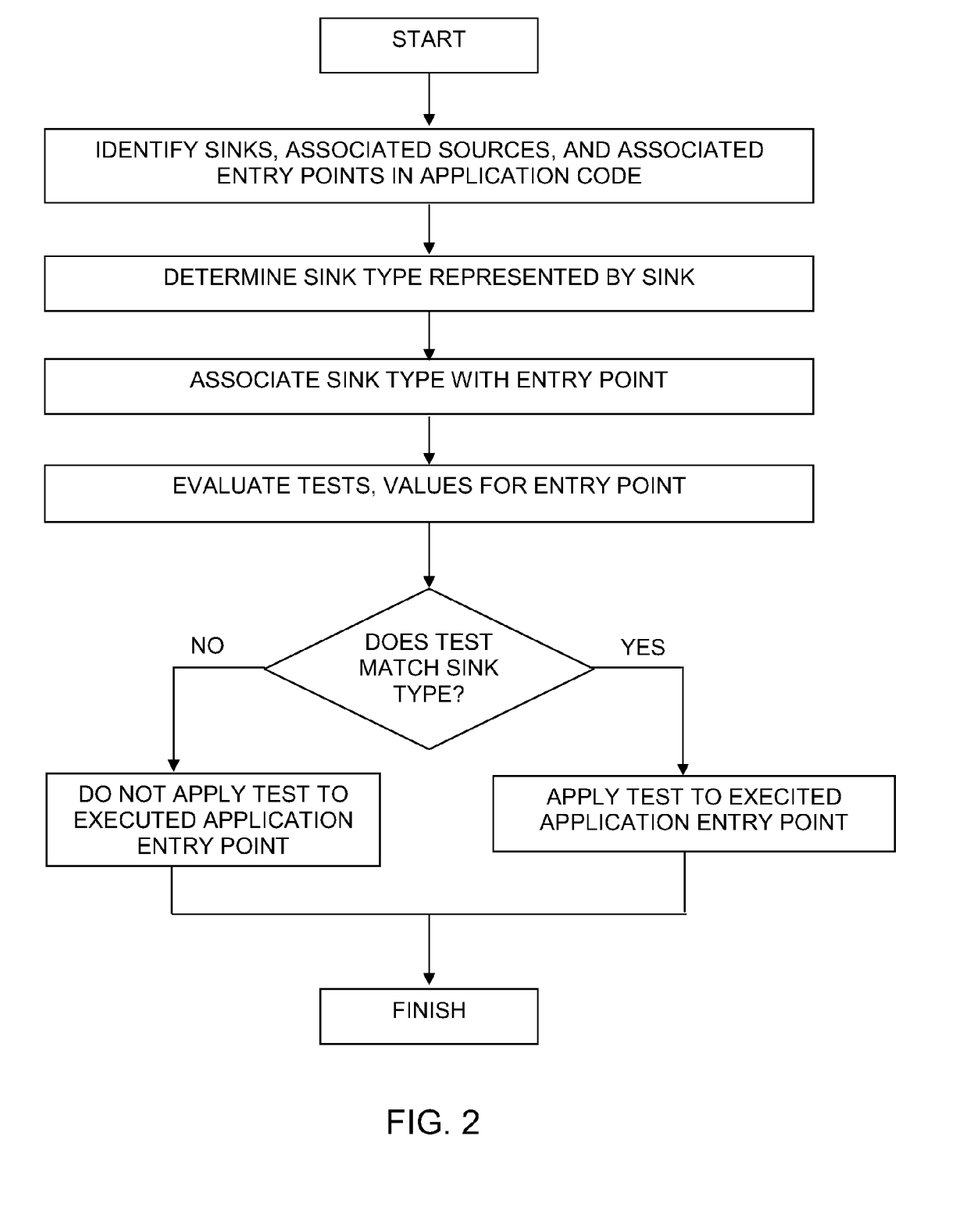
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, a white box testing method, such as static analysis, is preferably performed on the instructions of a computer software application to identify one or more sinks within the application, one or more sources within the application associated with the sinks, and one or more entry points within the application associated with the sources, where the sources receive inputs provided externally to the application via their associated entry points. Each sink is preferably analyzed to determine its sink type from among a predefined set of sink types, thus creating a correspondence between an entry point associated with a sink and the sink's sink type. One or more tests, and associated test values where applicable, are evaluated for each entry point to be tested of the application when it is executed, where the tests that match the sink type corresponding to the entry point are applied to the entry point, while tests that do not match the sink type are not applied to the entry point.

Figure 3:
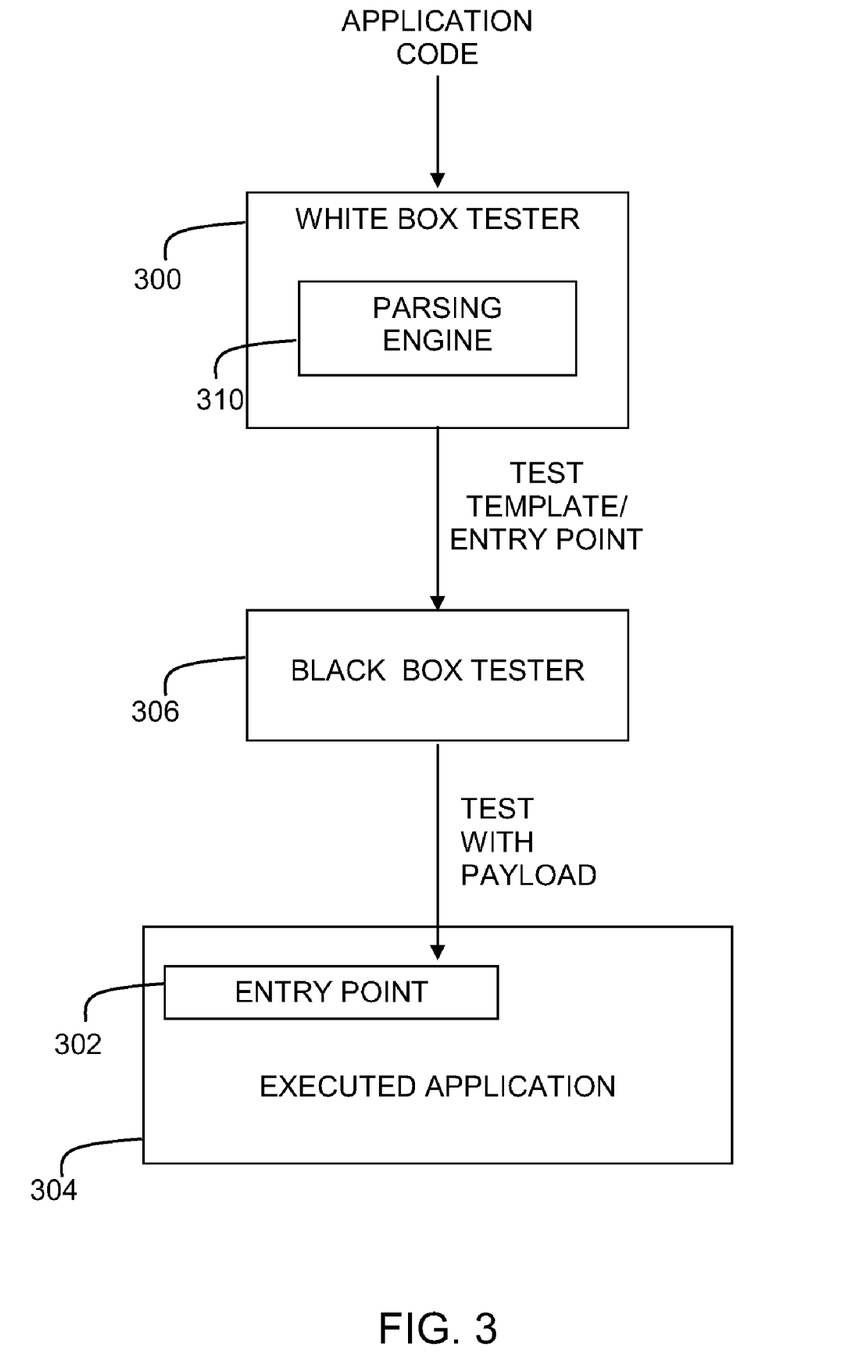
FIG. 3 is a simplified conceptual illustration of a system for optimizing black box testing using white box testing information, constructed and operative in accordance with an alternative embodiment of the invention.

Reference is now made to FIG. 3 which is a simplified conceptual illustration of a system for optimizing black box testing using white box testing information, constructed and operative in accordance with another embodiment of the invention. In the system of FIG. 3, a white box tester 300 uses conventional methods, such as static analysis, to analyze the instructions of an application to identify one or more sinks, one or more sources associated with any identified sinks, as well as one or more entry points 302 associated with any identified sources, as described above with reference to FIG. 1. Tester 300 determines a sink type represented by each sink from a predefined set of sink types, and thus establishes an association between entry point 302 and the sink type. Additionally, tester 300 includes a parsing engine 310, which preferably includes a parser configured for each sink type. For a given sink type, the parser configured for that sink type is used to analyze identified sinks of that sink type and create one or more test templates for each sink, such as in the form of a syntactically correct sequence of characters indicating a payload and any prefixes or suffixes required to envelop the payload so that the payload may be successfully processed by the sink. The test templates are preferably provided to, or otherwise made available to, a black box tester 306 together with identifiers indicating the entry points within the application with which the test templates are associated. For a given entry point 302 that is to be tested, black box tester 306 creates one or more tests using any test templates known to be associated with the entry point and applies the tests to the entry point 302 when the application is run as an executed application 304.

The system of FIG. 3 may also be understood by way of the following example, in which white box tester 300 identifies a sink that processes the following SQL statement:

SELECT*FROM users WHERE userid=<variable> where the value for <variable> is provided to a source associated with the sink via an application entry point. Parsing engine 310 analyzes the SQL statement and determines that a syntactically correct SQL injection with a malicious payload may be provided via <variable> as follows:

<value_for_userid>; <malicious payload>;--

White box tester 300 provides the above template with the identity of the associated entry point to black box tester 306. Black box tester 306 creates a test using the above template and applies the test to the application for testing via the entry point.

Figure 4:
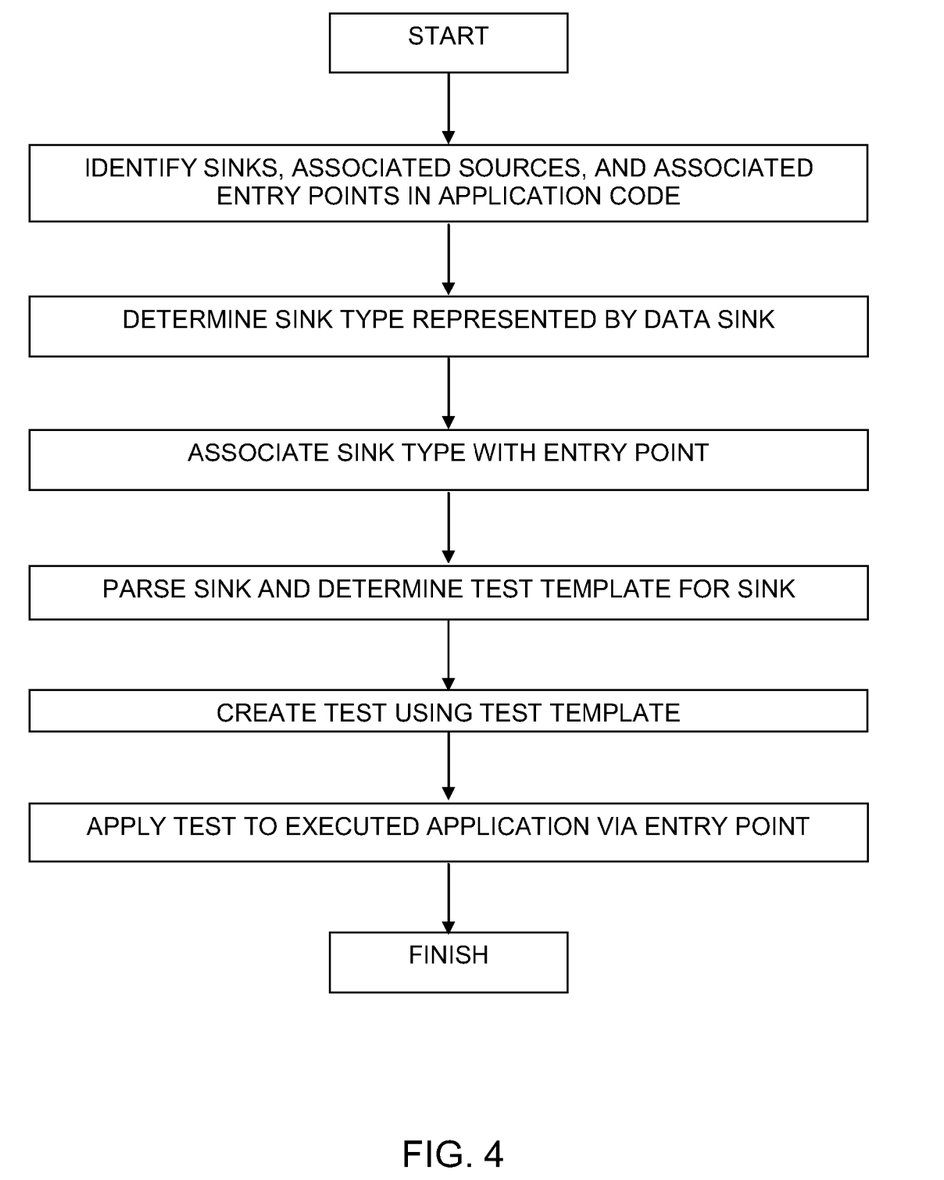
FIG. 4 is a simplified flowchart illustration of an exemplary method of operation of the system of FIG. 3, operative in accordance with another embodiment of the invention.

Reference is now made to FIG. 4 which is a simplified flowchart illustration of an exemplary method of operation of the system of FIG. 3, operative in accordance with an embodiment of the invention. In the method of FIG. 4, a white box testing method, such as static analysis, is preferably performed on the instructions of a computer software application to identify one or more sinks within the application, one or more sources within the application associated with the sinks, and one or more entry points within the application associated with the sources, where the sources receive inputs provided externally to the application via their associated entry points, as described in FIG. 2. Each sink is preferably analyzed to determine its sink type from among a predefined set of sink types, thus creating a correspondence between an entry point associated with a sink and the sink's sink type. The statements within the application that are processed by the sinks are parsed and a test template is determined for each sink, such as by defining a syntactically correct character sequence indicating a payload and any prefixes or suffixes required to envelop the payload so that the payload may be successfully processed by the sink. A test is created using the test template and applied to the application via the associated entry point when the application is run as an executed application.

It will be appreciated that by using the system and methods of the invention to optimize black box testing by using information obtained from white box testing to limit test values only to values that match their target sinks, the number of black-box tests required to provide proof of vulnerability may be significantly reduced.

Figure 5:
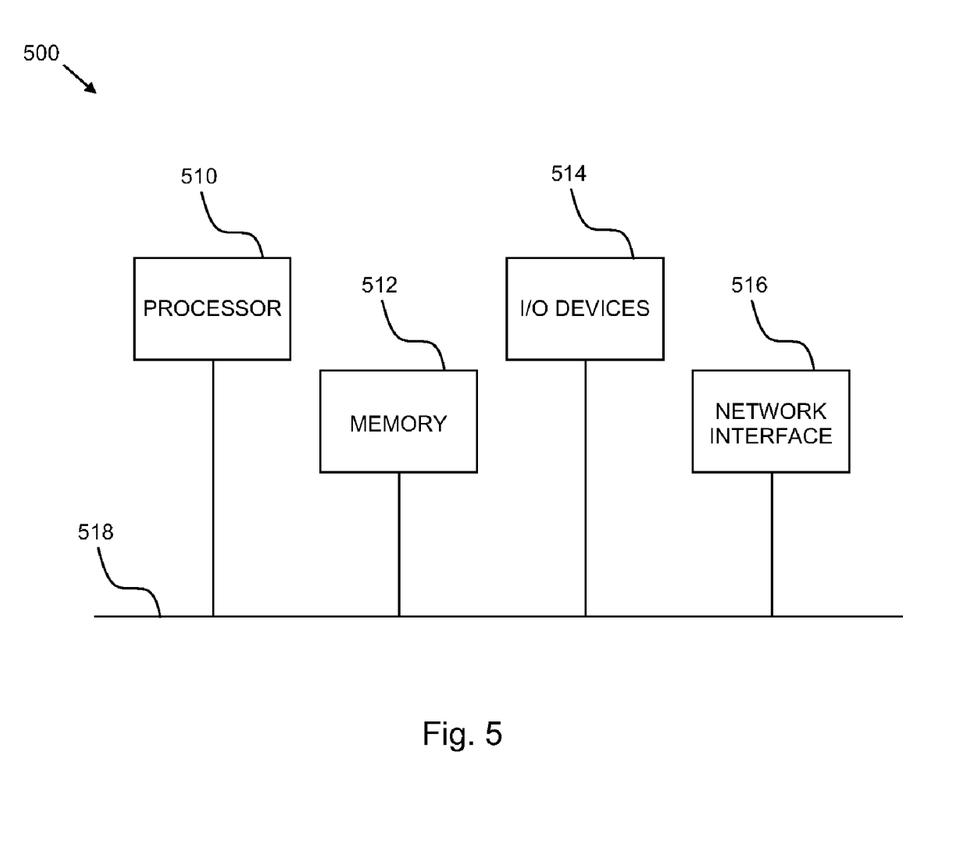
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for testing a computer software application, the method comprising:
    a) identifying a sink in a computer software application;
    b) identifying a source associated with said sink in said application;
    c) identifying an entry point associated with said source in said application, wherein said source is configured to receive input provided externally to an executable format of said application via said entry point;
    d) determining a sink type represented by said sink; and
    e) providing to a testing application information identifying said entry point and in association with said sink type, wherein the testing application is configured to apply an input via said entry point to the executable format of said application when said input is of a type that matches said sink type, wherein any of said identifying, determining, and providing steps are implemented in either of computer hardware and computer software and embodied in a computer-readable storage medium.

2. A method for testing a computer software application, the method comprising:
    a) identifying a sink in a computer software application;
    b) identifying a source associated with said sink in said application;
    c) identifying an entry point associated with said source in said application, wherein said source is configured to receive input provided externally to an executable format of said application via said entry point;
    d) determining a sink type represented by said sink; and
    e) creating a test template for said sink in accordance with said sink type, wherein any of said identifying, determining, and creating steps are implemented in either of computer hardware and computer software and embodied in a computer-readable storage medium.

3. The method according to claim 2 and further comprising providing to a testing application said test template in association with information identifying said entry point.

4. The method according to claim 3 and further comprising configuring said testing application to create a test using said test template.

5. The method according to claim 4 and further comprising configuring said testing application to apply said test to the executable format of said application via said entry point.

6. A system for testing a computer software application, the system comprising:
    a white box tester configured to:
        identify a sink in a computer software application;
        identify a source associated with said sink in said application;
        identify an entry point associated with said source in said application, wherein said source is configured to receive input provided externally to an executable format of said application via said entry point; and
        determine a sink type represented by said sink; and
    a black box tester configured to:
        receive information provided by said white box tester indicating that said entry point is associated with said sink type, wherein any of said white box tester and said black box tester are implemented in either of computer hardware and computer software and embodied in a computer-readable storage medium; and
        apply an input via said entry point to the executable format of said application when said input is of a type that matches said sink type.

7. A system for testing a computer software application, the system comprising:
- a white box tester configured to
  - identify a sink in a computer software application,
  - identify a source associated with said sink in said application,
  - identify an entry point associated with said source in said application,
  - wherein said source is configured to receive input provided externally to an executable format of said application via said entry point, and
  - determine a sink type represented by said sink; and
- a parser configured to create a test template for said sink in accordance with said sink type, wherein any of said white box tester and said parser are implemented in either of computer hardware and computer software and embodied in a computer-readable storage medium.

8. The system according to claim 7 and further comprising a black box tester configured to receive said test template in association with information identifying said entry point.

9. The system according to claim 8 wherein said black box tester is configured to create a test using said test template.

10. The system according to claim 9 wherein said black box tester is configured to apply said test to the executable format of said application via said entry point.

* * * * *